March 3, 1936.  H. L. ADAMS  2,032,824
PARACHUTE FOR PASSENGERS AND/OR AIRCRAFT
Filed Nov. 22, 1932   3 Sheets-Sheet 2

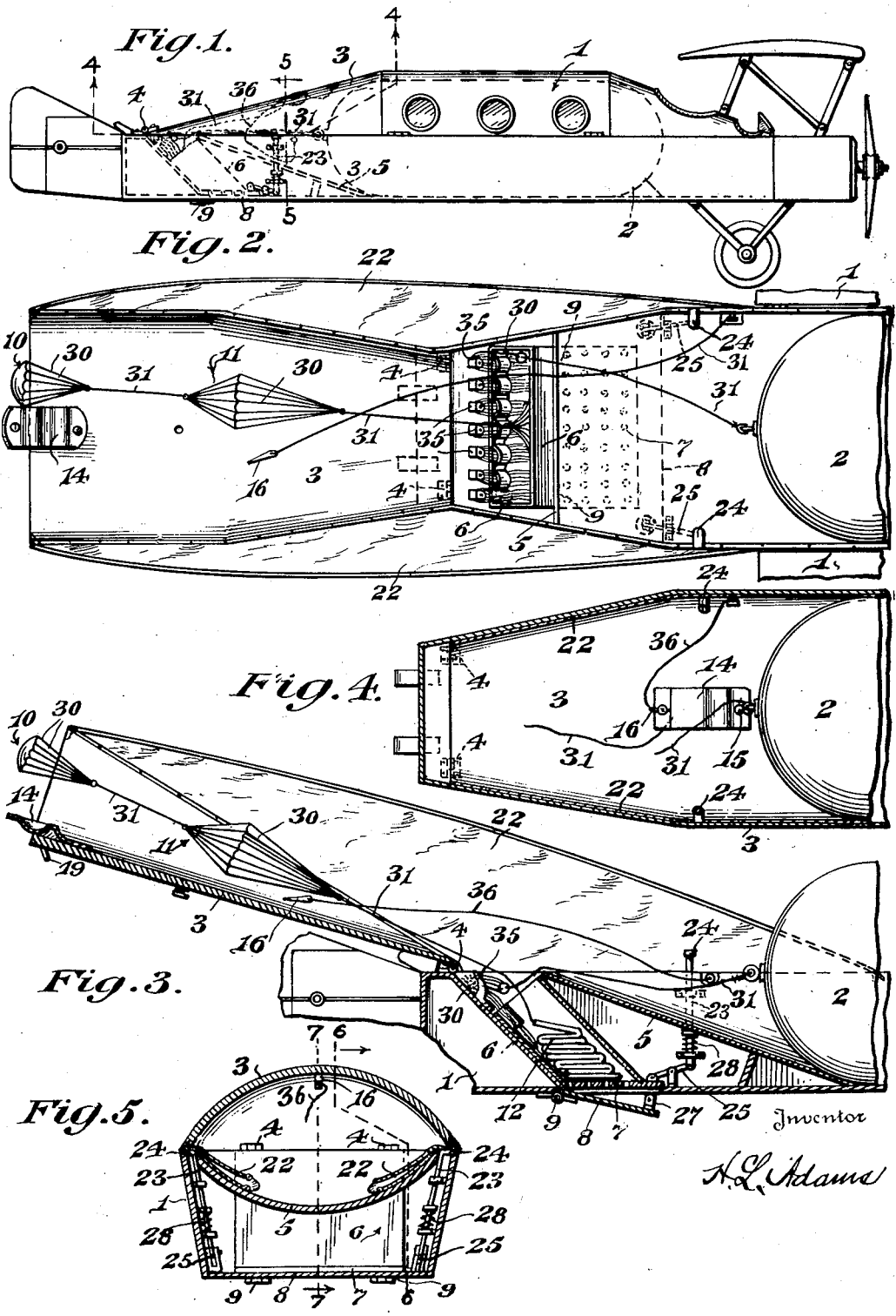

Inventor
H. L. Adams

Inventor
H. L. Adams

Patented Mar. 3, 1936

2,032,824

UNITED STATES PATENT OFFICE 2,032,824

PARACHUTE FOR PASSENGERS AND/OR AIRCRAFT

Herbert Luther Adams, Washington, D. C.

Application November 22, 1932, Serial No. 644,554

15 Claims. (Cl. 244—21)

This invention relates to flying machines of the heavier than air type, and the application is a continuation in part of my prior application Serial Number 461,412, filed April 14, 1921, and since maturing into Patent 1,888,418.

The primary object of the invention is to provide means insuring the utmost possible degree of safety for lowering a load from a disabled flying machine in flight.

One of the more specific objects of the invention is to provide means for storing a parachute device in a flying machine, and for discharging the device from the flying machine, in such a manner that the likelihood of any parts of the device becoming entangled with each other or with any part of the flying machine is reduced to a minimum.

A further object of the invention is to provide a parachute device having means for controlling its descent with a suspended load.

A further object of the invention is to provide a parachute device of the character aforesaid which will be discharged automatically with its connected load following the manual release of normally latched ejecting mechanism.

The invention is illustrated in the accompanying drawings in which:

Figure 1 is a side elevation of a flying machine embodying this invention.

Figure 2 is an enlarged fragmentary top plan thereof showing an early stage of the parachute ejecting operation.

Figure 3 is a fragmentary longitudinal section showing the same stage of the ejecting operation.

Figure 4 is a section taken on the line 4—4 of Figure 1 showing the lower face of the rearwardly swinging cover.

Figure 5 is a transverse section taken on the line 5—5 of Figure 1.

Figure 6:
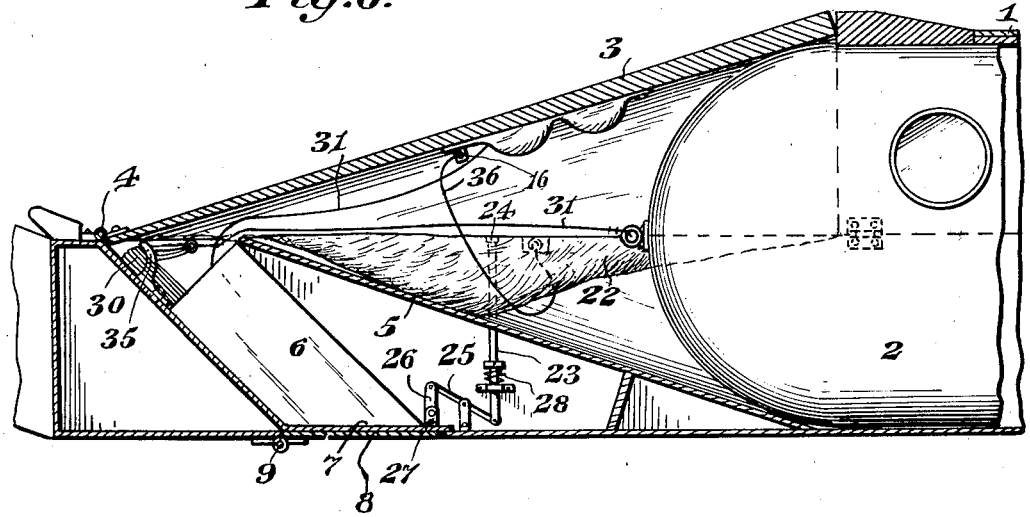
Figure 6 is an enlarged fragmentary longitudinal section showing the cover in closed position and taken where indicated by the line 6—6 of Figure 5.
Figure 7:
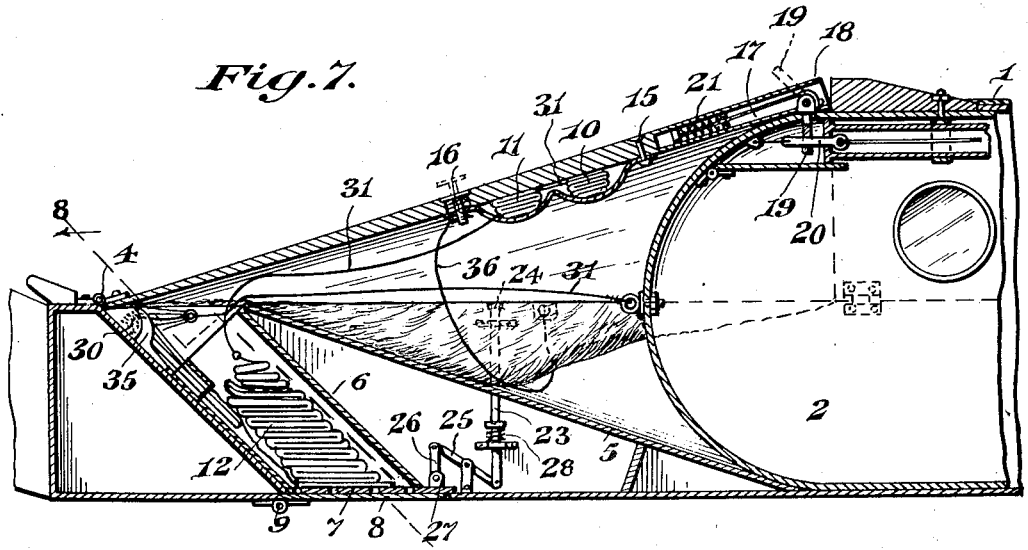
Figure 7 is a view similar to Figure 6 but taken centrally as indicated by the line 7—7 of Figure 5.
Figure 8:
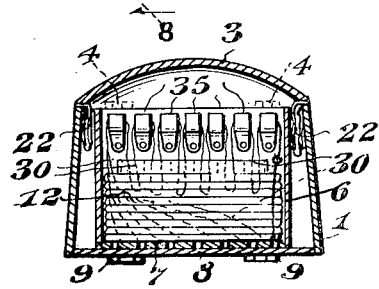
Figure 8 is a section taken on the line 8—8 of Figure 7.

Referring to the drawings in detail, the numeral 1 indicates a flying machine equipped with a detachable cabin 2. A substantial rear portion of the flying machine body is formed with an open top normally closed by a cover 3 which extends throughout the entire width of the body, and is stream lined with the body, thereby giving the cover a convex shape tapering rearwardly. The forward portion of the cover extends over the rear portion of the cabin, and the rear edge of the cover is hinged to the body at 4.

Beneath the cover 3, the body of the flying machine is provided with a partition 5 which is concave in cross section to correspond with the contour of the cabin, and which slopes upwardly and rearwardly, terminating at its rear edge in spaced relation to the hinge 4. Rearwardly of the partition 5 is an open top, rearwardly sloping container 6 for a parachute or plurality of parachutes. The container 6 is formed with a perforated bottom 7, and the bottom of the body, immediately beneath the bottom of the container, is provided with a door 8 hinged at its rear edge as shown at 9.

Figure 9:
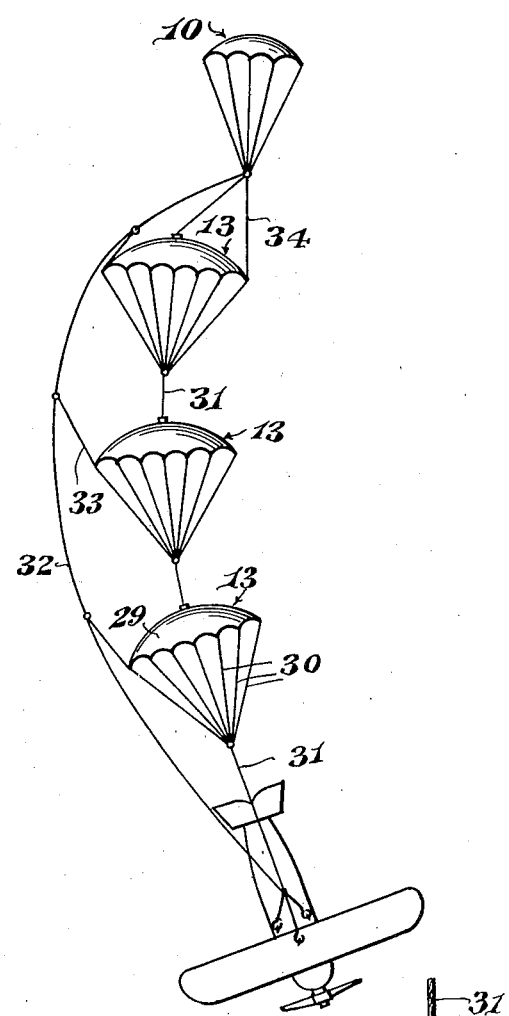
Figures 9 and 10 are diagrammatic views showing a tandem string of parachutes with suspended load and with a pilot parachute and control means therefor.
Figure 10:
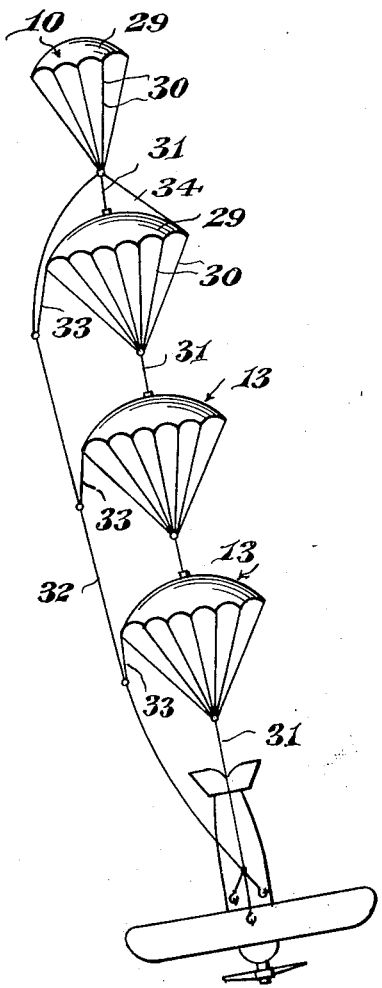
Figure 11:
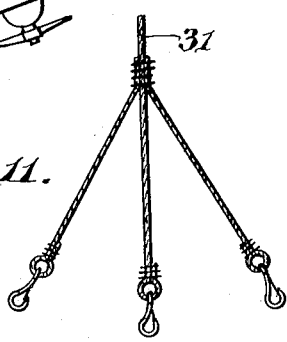
Figure 11 is an enlarged detail showing means for connecting parachutes to a flying machine.

The invention contemplates the use of a pilot chute detachably secured to the inner face of the cover 3, and at least one larger parachute disposed within the container 6. In Figures 2 and 3, I show a pilot 10, a larger intermediate parachute 11, and a still larger main parachute 12. In Figures 9 and 10, I show the pilot chute 10 in connection with a series of larger parachutes 13 of equal size. It is not intended to restrict the invention to either specific arrangement, as it is only essential to employ a pilot parachute with at least one other parachute, all connected together in tandem.

The pilot chute 10 is detachably secured to the inner face of the cover, substantially centrally of the latter, by means of a retaining member 14 which is preferably flexible. The member 14 is secured directly to the cover at its forward edge by means of any suitable fastening device such as a bolt 15. At its rearward edge, the member 14 is connected with a pin 16 removably secured to the cover 3.

Forwardly of the retaining member 14, the cover 3 is formed with a recess 17 which opens through the forward edge of the cover, and the upper and lower walls of which are formed with a slot 18 also opening through the forward edge of the cover. Pivoted within the recess 17, adjacent the slot 18, is a latch pin 19 which is normally engaged by a latch member 20 to maintain the cover 3 in closed position. Disposed within the recess 17, rearwardly of the pin 19, is a tension device 21 which is secured to the pin in a manner to urge the latter to swing about its pivot through the slot 18.

Connected to each side edge of the cover 3, and extending throughout the entire length of the cover, is a substantially triangular shaped guard member 22 formed of flexible material. The guard member 22 also is secured to the edge of the body 1 adjacent the cover 3. When the cover is closed, the guard members 22 depend into the space beneath the cover in a folded condition, and when the cover is open, the guard members extend forwardly and rearwardly from the line of hinged connection of the cover with the body as more clearly shown in Figure 2.

Disposed on opposite sides of the body 1, rearwardly of the cabin 2, are a pair of vertically disposed rods 23, which slidably extend through the partition 5, and the upper ends 24 of which bear against the cover 3. The lower end of each rod 23 is pivotally connected to one end of a lever 25, the opposite end of which is pivotally connected to a link 26 having a jointed connection 27 with the door 8 beneath the container 6. Encircling the rods 23 are springs 28 which constantly urge the rods upwardly when the cover is in closed position.

As more clearly shown in Figures 9 and 10, each parachute includes a canopy 29 having a plurality of shroud lines 30 projecting from the periphery thereof. The projecting ends of the shroud lines of each parachute are connected to the canopy of the next adjacent parachute, at the center of the canopy, by means of an anchor line 31, with the anchor line of the innermost or lowermost parachute connected with the load to be suspended. The nature of the load is immaterial, and may be a complete aircraft, or some detachable part thereof, or a passenger thereon.

The shroud lines 30 and anchor line 31 of the pilot chute 10 are connected to one end of a guide line 32, the opposite end of which is suitably secured adjacent the load to be suspended. The guide line is connected with the canopy of each succeeding parachute at the periphery of the canopy by means of a snub line 33. The canopy of the parachute next adjacent the pilot chute also is connected with the guide line at its point of connection between the shroud lines 30 and anchor line 31 of the pilot chute by means of a control line 34. The point of connection between this canopy and the control line 34 is diametrically opposite the point of connection between the canopy and its small line 33.

In practice, the main parachute 12 is stored within the container 6, with the shroud line 30 of the parachute looped over hooks 35 carried by the container to prevent tangling of the lines. The projecting ends of the shroud lines 30 of the parachute 12 are connected by means of the anchor line 31 to the load to be suspended, such as the cabin 2. The canopy of the parachute 12 is connected with the shroud lines of the next adjacent parachute by means of a similar anchor line, and so on until all of the parachutes employed are connected in tandem.

When it is desired to launch the parachutes, the latch member 20 is withdrawn manually from engagement with the latch pin 19, whereby opening movement of the cover 3 is automatically initiated by the rods 23 constantly forced against the cover by the springs 28. Owing to the link and lever connections between the rods 23 and the door 8, opening movement of the latter is initiated simultaneously with that of the cover 3. As soon as the cover 3 starts to open, the air rushing past the body 1 flows under the cover whereby the latter is swung about its hinges to the position shown in Figures 2 and 3.

When the cover 3 is swung to open position, the pin 16 is withdrawn, owing to an anchor line 36 secured thereto and to some relatively immovable part such as the anchor line 31 connected with the load to be suspended. The removal of the pin 16 pulls the retaining member 14 away from the pilot chute 10, and the latter is thrown free to be caught by the onrushing air to pull the connected parachutes from the machine. At the same time that air rushes under the cover 3 to open the same, it also rushes between the door 8 and the body, thus forcing the door open, and entering the container 6 through its perforated bottom to assist in forcing the parachute 12 from the container. As soon as the cover 3 moves far enough to disengage the latch pin 19 from its latching position, the pin is swung about its pivot and through the slot 18 by the action of the tension device 21. In this manner, the pin is projected from the outer face of the cover, instead of from the inner face thereof, whereby any possibility of the ejected parachutes becoming fouled on the pin is eliminated. At the same time, the guard members 22 are stretched to their full length for cooperation with the cover 3 and body 1 to form a substantially U-shaped trough for guiding the parachutes as they leave the machine.

During the descent of the parachutes with their suspended load, the pilot chute 10 normally is maintained at one side of the vertical plane of the next adjacent parachute by means of the control line 34 which operates automatically. This tends to pull all of the parachutes out of alignment with each other whereby the canopies are disposed obliquely to the anchor lines secured thereto. If it is desired to move the pilot chute toward the opposite side of the vertical plane of the next adjacent parachute, this may be done by pulling on the guide line 32, which is maintained substantially diametrically opposite the control line 34 by means of the snub lines 33.

Having thus described my invention, what I claim to be new, and desire to secure by Letters Patent, is:—

1. In a flying machine, a body, a parachute container supported by the body, a cover hinged at its rear edge and extending across the container and having a recess in its forward portion with the upper and lower walls of the recess formed with a slot extending rearwardly from the forward edge of the cover, a latch member pivoted to the cover and releasably secured to the body, means for releasing the latch member from the body, a vertically disposed rod having its upper end in engagement with the lower face of the cover, tension means connected with said rod for initiating opening movement of the cover upon the release of said latch member whereby air may flow under the cover to swing it to open position, tension means within said recess for swinging the latch member through said slot during the opening movement of the cover, a pilot parachute positioned against the lower face of the cover, a releasable retaining member normally holding the pilot parachute in position, means for releasing said retaining member upon swinging movement of the cover to launch the pilot parachute, a plurality of larger parachutes connected in tandem within the container, one of said larger parachutes being connected to the pilot parachute and another of said larger parachutes being connected to a load to be suspended, a perforated bottom for the container, a door hinged at its rear edge beneath the container, link mechanism connecting the door with said vertical rod whereby the door is opened upon movement of the rod to admit air through the perforated bottom of the container, guard members secured to the cover adjacent the side edges thereof to protect the parachutes when leaving the machine, and means connected with the pilot parachute for guiding the suspended load during descent.

2. In a flying machine, a body, a parachute container supported by the body, a cover hinged at its rear edge and extending across the container and having a recess in its forward portion with the upper and lower walls of the recess formed with a slot extending rearwardly from the forward edge of the cover, a latch member pivoted to the cover and releasably secured to the body, means for releasing the latch member from the body, mechanical means for initiating opening movement of the cover upon the release of said latch member whereby air may flow under the cover to swing it to open position, tension means within said recess for swinging the latch member through said slot during the opening movement of the cover, a pilot parachute positioned against the lower face of the cover, a releasable retaining member normally holding the pilot parachute in position, means for releasing said retaining member upon swinging movement of the cover to launch the pilot parachute, a main parachute within the container, means for connecting the main parachute to the pilot parachute and to a load to be suspended, a perforated bottom for the container, a door hinged at its rear edge beneath the container, means made operative by the release of the latch member for opening the door to admit air through the perforated bottom of the container, guard members secured to the cover adjacent the side edges thereof to protect the parachutes when leaving the machine, and means connected with the pilot parachute for guiding the suspended load during descent.

3. In a flying machine, a body, a parachute container supported by the body, a cover hinged at its rear edge and extending across the container, a latch member pivoted to the cover and releasably secured to the body, means for releasing the latch member from the body, mechanical means for initiating opening movement of the cover upon the release of said latch member whereby air may flow under the cover to swing it to open position, means for swinging the latch member in a vertical arc upon swinging movement of the cover, a pilot parachute positioned against the lower face of the cover, a releasable retaining member normally holding the pilot parachute in position, means for releasing said retaining member and removing the same from the pilot parachute upon swinging movement of the cover to launch the pilot parachute, a main parachute within the container, means for connecting the main parachute to the pilot parachute and to a load to be suspended, guard members secured to the cover adjacent the side edges thereof to protect the parachutes when leaving the machine, and means connected with the pilot parachute for guiding the suspended load during descent.

4. In a flying machine, a body, a parachute container supported by the body, a cover hinged at its rear edge and extending across the container, a latch member pivoted to the cover and releasably secured to the body, means for releasing the latch member from the body, mechanical means for initiating opening movement of the cover upon the release of said latch member whereby air may flow under the cover to swing it to open position, a pilot parachute adapted to be discharged by the opening movement of the cover, a main parachute within the container, means for connecting the main parachute to the pilot parachute and to a load to be suspended, and guard members secured to the cover adjacent the side edges thereof and to the body adjacent the cover for coaction with the cover and body to provide a substantially U-shaped trough to protect the parachute when leaving the machine.

5. In a flying machine, a device for checking the descent of falling bodies, means for supporting the device on and discharging the device from the machine, said device comprising a plurality of parachutes, each including a canopy, a plurality of shroud lines for each parachute, said shroud lines being connected with the canopy and having portions projecting from the periphery thereof, an anchor line having one end connected with the ends of the projecting portions of the shroud lines of each parachute, the lowermost of said anchor lines having its opposite end connected with the falling body and each other anchor line having its opposite end connected with the center of the next adjacent canopy, a pilot parachute including a canopy and a plurality of shroud lines connecting the periphery of the last named canopy with the uppermost of said anchor lines, a guide line having one end secured to the shroud lines of the pilot parachute and having its other end secured adjacent the falling body, snub lines connecting the guide line with the peripheries of the canopies of said plurality of parachutes, and a control line connecting the anchor line and shroud lines of the pilot parachute to the periphery of the canopy of the nearest of said plurality of parachutes at a point diametrically opposite the snub line for the last mentioned parachute.

6. In a flying machine, a device for checking the descent of falling bodies, means for supporting the device on and discharging the device from the machine, said device comprising a plurality of parachutes, each including a canopy, a plurality of shroud lines for each parachute, said shroud lines being connected with the canopy and having portions projecting from the periphery thereof, an anchor line having one end connected with the ends of the projecting portions of the shroud lines of each parachute, the lowermost of said anchor lines having its opposite end connected with the falling body and each other anchor line having its opposite end connected with the center of the next adjacent canopy, a pilot parachute including a canopy and a plurality of shroud lines connecting the periphery of the last named canopy with the uppermost of said anchor lines, means for normally offsetting the pilot parachute with respect to said plurality of parachutes whereby the canopies of said plurality of parachutes are normally held oblique to the anchor line, and a guide line operatively connected with the shroud lines of the pilot parachute and with the canopies of said plurality of parachutes whereby all of said parachutes may be hauled into alignment.

7. In a flying machine, a device for checking the descent of falling bodies, means for supporting the device on and discharging the device from the machine, said device comprising a plurality of parachutes connected together in tandem formation, each of said parachutes including a canopy, a pilot parachute having connecting means with the center and periphery of the outermost canopy whereby the pilot parachute is offset with respect to the plurality of parachutes to hold the latter out of alignment, and a guide line having connecting means with the pilot parachute and the canopies of said plurality of parachutes whereby all of said parachutes may be hauled into alignment.

8. In a flying machine, a device for checking the descent of falling bodies, means for supporting the device on and discharging the device from the machine, said device comprising a plurality of parachutes, each including a canopy, a plurality of shroud lines for each parachute, said shroud lines being connected with the canopy and having portions projecting from the periphery thereof, an anchor line having one end connected with the ends of the projecting portions of the shroud lines for each parachute, the lowermost anchor line having its opposite end connected with the falling body and each other anchor line having its opposite end connected with the center of the next adjacent canopy, means connecting the shroud lines of the outermost parachute with the periphery of the canopy of the adjacent parachute, and a guide line having one end connected with the shroud lines of the outermost parachute and having its opposite end secured adjacent the falling body.

9. In a flying machine, a device for checking the descent of falling bodies, means for supporting the device on and discharging the device from the machine, said device comprising a plurality of parachutes connected together in tandem formation, means normally holding the outermost parachute out of alignment with the adjacent parachute, and a guide line connected with said parachutes for hauling them into alignment.

10. In a flying machine, a device for checking the descent of falling bodies, means for supporting the device on and discharging the device from the machine, said device comprising a plurality of parachutes connected together in tandem formation, means normally and automatically pulling the outermost parachute to one side of the vertical plane of the next adjacent parachute, and manually controlled means for pulling said outermost parachute toward the opposite side of said vertical plane.

11. In a flying machine, a body, a parachute container supported by the body, a cover hinged at its rear edge and extending across the container, said cover having its forward portion formed with a recess, said recess having its upper and lower walls formed with a slot extending rearwardly from the forward edge of the cover, a latch member pivoted to the cover and releasably secured to the body, means for releasing the latch member from the body, means for swinging the cover about its mounting upon release of the latch member, and means for swinging the latch member through said slot upon swinging movement of the cover.

12. In a flying machine, a body, a parachute container supported by the body, a cover hinged at its rear edge and extending across the container, said cover having a transverse slot, a latch member pivoted to the cover adjacent said slot for latching the cover to the body, means for swinging the cover about its mounting to open the cover, and means for swinging the latch member through said slot upon swinging movement of the cover.

13. In a flying machine, a body, a parachute container supported by the body, a hinged cover extending across the container, means for latching the cover in closed position, means for releasing the latch means, a swinging door beneath the container, a vertically disposed rod engaging said cover, tension means forcing the rod toward the cover whereby the latter is automatically opened when released, and link and lever mechanism connecting said rod with said door whereby the latter is opened simultaneously with the cover.

14. In a flying machine, a body, a parachute container supported by the body, a cover hinged at its rear edge and extending across the container, means for swinging the cover about its mounting to open position, means for ejecting a parachute from the container, and guard members connected with the cover and with the body adjacent the side edges of the cover for coaction with the cover and body to provide a substantially U-shaped trough when the cover is open for guiding an ejected parachute.

15. In a flying machine, a parachute container, a hinged cover extending across the container to close the same, means for swinging the cover about its mounting to open position, a pilot parachute positioned against the lower face of the cover, a releasable retaining member normally holding the pilot parachute in position, and anchored means connected with said retaining member for releasing the latter and removing it from the pilot parachute when the cover is swung about its mounting.

HERBERT L. ADAMS.